(12) United States Patent
Champion et al.

(10) Patent No.: US 8,005,848 B2
(45) Date of Patent: *Aug. 23, 2011

(54) STREAMLINED DECLARATIVE PARSING

(75) Inventors: Michael Craig Champion, Woodinville, WA (US); Anders Hejlsberg, Seattle, WA (US); Andrew Eyring Kimball, Sammamish, WA (US); Ralf Lammel, Redmond, WA (US); Henricus Johannes Maria Meijer, Mercer Island, WA (US); David L. Remy, Mercer Island, WA (US); Ion Vasilian, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 303 days.

This patent is subject to a terminal disclaimer.

(21) Appl. No.: 11/770,696

(22) Filed: Jun. 28, 2007

(65) Prior Publication Data

US 2009/0006429 A1 Jan. 1, 2009

(51) Int. Cl.
*G06F 12/00* (2006.01)
*G06F 17/30* (2006.01)
(52) U.S. Cl. .................................. 707/755; 717/143
(58) Field of Classification Search .................. 707/755, 707/999.1; 717/143
See application file for complete search history.

(56) References Cited

U.S. PATENT DOCUMENTS

| | | | |
|---|---|---|---|
| 5,878,408 A * | 3/1999 | Van Huben et al. ............... 707/1 |
| 6,507,856 B1 | 1/2003 | Chen | |
| 6,567,814 B1 | 5/2003 | Bankier | |
| 6,671,853 B1 | 12/2003 | Burkett | |
| 6,732,153 B1 | 5/2004 | Jakobson et al. | |
| 6,820,135 B1 * | 11/2004 | Dingman et al. ............. 709/246 |
| 6,832,219 B2 | 12/2004 | Lal | |
| 6,862,588 B2 | 3/2005 | Beged-Dov et al. | |
| 6,880,125 B2 | 4/2005 | Fry | |
| 6,886,166 B2 | 4/2005 | Harrison et al. | |
| 6,898,604 B1 | 5/2005 | Ballinger | |
| 6,925,631 B2 | 8/2005 | Golden | |
| 7,073,123 B2 | 7/2006 | Friedman et al. | |
| 7,076,766 B2 | 7/2006 | Wirts | |
| 7,120,645 B2 * | 10/2006 | Manikutty et al. ............ 707/102 |
| 7,120,864 B2 | 10/2006 | Cai | |
| 7,124,137 B2 | 10/2006 | Lin | |
| 7,177,874 B2 * | 2/2007 | Jardin ........................... 707/100 |
| 7,181,440 B2 * | 2/2007 | Cras et al. ......................... 707/2 |
| 7,206,805 B1 | 4/2007 | McLaughlin | |
| 7,254,590 B2 * | 8/2007 | Mudunuri et al. ............ 707/200 |

(Continued)

FOREIGN PATENT DOCUMENTS

GB 2262370 A * 6/1993

OTHER PUBLICATIONS

Dan Olteanu, Tim Furche, François Bry, An efficient single-pass query evaluator for XML data streams, 2004, Proceedings of the 2004 ACM symposium on Applied computing, pp. 627-631, retrieved from ACM digital library.*

(Continued)

*Primary Examiner* — Sathyanarayan Pannala
(74) *Attorney, Agent, or Firm* — Workman Nydegger

(57) ABSTRACT

Programming mechanisms for data parsing facilitate both clear code specification and efficient execution. Declarative style code can be employed to enable clear and concise specification of data parsing. Further, an efficient parsing approach can be utilized that enables processing of a data structure without first materializing the entire structure to memory. More specifically, streaming and/or selective materialization of portions of data to memory can be employed.

20 Claims, 10 Drawing Sheets

U.S. PATENT DOCUMENTS

| | | | |
|---|---|---|---|
| 7,313,575 B2* | 12/2007 | Carr et al. | 707/104.1 |
| 2002/0038320 A1 | 3/2002 | Brook | |
| 2003/0217026 A1 | 11/2003 | Teig | |
| 2003/0220906 A1 | 11/2003 | Chickering | |
| 2005/0097455 A1 | 5/2005 | Zhou et al. | |
| 2005/0120044 A1 | 6/2005 | Angele | |
| 2005/0125436 A1* | 6/2005 | Mudunuri et al. | 707/102 |
| 2005/0138542 A1 | 6/2005 | Roe et al. | |
| 2005/0198057 A1 | 9/2005 | Antoch | |
| 2006/0020951 A1 | 1/2006 | Fry et al. | |
| 2006/0195413 A1* | 8/2006 | Davis et al. | 707/1 |
| 2006/0200499 A1* | 9/2006 | Bhatia et al. | 707/200 |
| 2006/0212457 A1 | 9/2006 | Pearce | |
| 2006/0242563 A1 | 10/2006 | Liu | |
| 2007/0005622 A1 | 1/2007 | Fernandes | |
| 2007/0050760 A1 | 3/2007 | Liu et al. | |
| 2009/0006450 A1 | 1/2009 | Champion | |
| 2009/0177799 A1 | 7/2009 | Fitzek | |
| 2010/0042982 A1 | 2/2010 | Aharoni | |

OTHER PUBLICATIONS

Lammel. "API-based XML streaming with FLWOR power and functional updates," http://2006.xmlconference.org/proceedings/91/presentation.pdf, last accessed Mar. 9, 2007, 16 pages.

Tarari. "RAX: Random Access XML—Fundamentally Changing How XML is Used and Processed," http://xml.coverpages.org/Tarari-RAX-WhitePaper200405.pdf, last accessed Mar. 9, 2007, 30 pages, San Diego, CA.

Binary XML Codec (Nux 1.6- API Specification). "Class BinaryXMLCodec," http://dsd.lbl.gov/nux/api/nux/xom/binary/BinaryXMLCodec.html, 8 pages.

API Help (Object-Oriented Game Playing Framework). "How This API Document Is Organized," http://www.lhup.edu/mcohen/oogt/docs/help-doc.html, Mar. 1, 2007, 2 pages.

Nehrer. An Introduction to Streaming API for XML (StAX'ing up XML, http://www.128.ibm.com/developerworks/library/x-stax1.html, Part 1, Nov. 29, 2006, 10 pages.

U.S. Appl. No. 11/770,696, Mail Date Jul. 2, 2009, Office Action.
U.S. Appl. No. 11/770,696, Mail Date Jan. 7, 2010, Office Action.
U.S. Appl. No. 11/770,696, Mail Date Jul. 21, 2010, Office Action.
U.S. Appl. No. 11/771,163, Mail Date Jul. 22, 2009, Office Action.
U.S. Appl. No. 11/771,163, Mail Date Feb. 22, 2010, Office Action.
U.S. Appl. No. 11/771,163, Mail Date Sep. 29, 2010, Office Action.
U.S. Appl. No. 11/771,163, Mail Date Mar. 15, 2011, Office Action.

* cited by examiner

STREAMLINED DECLARATIVE PARSING

BACKGROUND

The pervasiveness of computers and other processor-based devices has resulted in data proliferation such that vast amounts of digital data are created and stored daily. Although originally the sole domain of well-funded companies and research institutions, technology advancements and cost reductions over time have enabled computers and other electronic devices to become commonplace in the lives of most everyone. As a result, both businesses and consumers create and interact with large amounts of digital data.

Traditionally, a database management system (DBMS) is employed to manage interaction with database data. The DBMS efficiently manages requests or queries from users and programs so that these entities are free from having to know specifics pertaining to how and where data is physically stored. Furthermore, in handling requests, the DBMS ensures integrity and security with respect to the data. The most common DBMS is a relational database management system (RDBMS). In this system, data is stored in a tabular format wherein data resides at intersections of rows and columns.

With the advent and growing popularity of the Internet and other networking technologies, various other structured data languages or formats have been developed to facilitate storing and sharing of information across different technology systems. One such language is XML (eXtensible Markup Language), which is a standard language that allows entities and/or groups to share information in a convenient fashion. This language uses tags or symbols to markup or describe content. Another format or scripting language that enables sharing of data is JSON (JavaScript™ Object Notation). JSON is a lightweight data exchange format rather than a markup language that utilizes a collection of name-value pairs and arrays of values to represent data. XML and JSON can capture various computer data structures (e.g., objects, lists, trees . . . ) for storage and/or transmission.

A myriad of application programming interfaces (APIs) and/or language implementations can be employed to process structured data. For example, XML data can be formatted, queried and/or transformed by XSLT, XQuery and/or XPath. These and other conventional mechanisms operate by loading an entire data structure in memory and subsequently performing operations over the materialized data structure.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to data parsing in a computer environment. More particularly, data is parsed serially in accordance with declarative code. The size of a data structure that can be processed in-memory is limited by available memory. As a result, certain scenarios, including those involving a large amount of data, may not be feasible or affordable with in-memory processing. In accordance with one aspect of this disclosure, such issues can be remedied by parsing data without first requiring materialization of an entire structure to memory. Various streaming or serial parsing semantics can be employed alone or in combination with selective materialization of portions of data to facilitate efficient processing. Furthermore, data parsing can be described clearly and concisely with declarative style code, rather than lower level or imperative style code.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods are provided hereinafter for affording a declarative manner of parsing data without loading an entire structure to memory. In other words, data can be described in a clear and concise manner and processed efficiently. Efficient processing is accomplished utilizing data streaming or and/or selective materialization. Further, various mechanisms are disclosed to confront specific processing circumstances. For example, mechanisms are provided for efficiently processing nested queries and branch queries.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
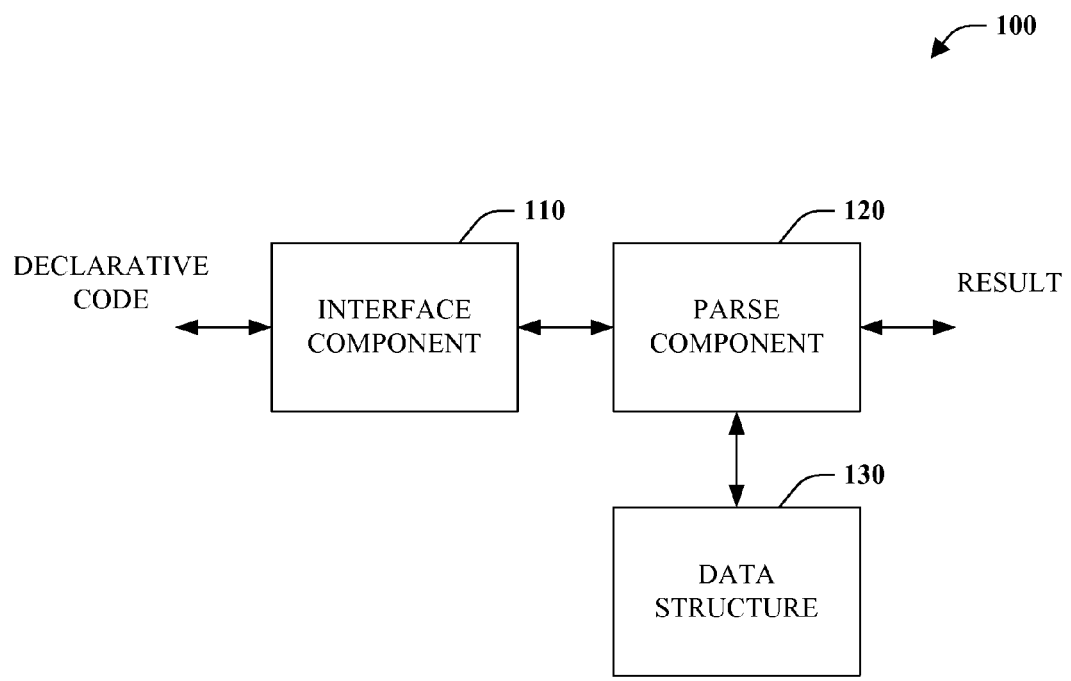
FIG. 1 is a block diagram of a data parsing system in accordance with an aspect of the claimed subject matter.

Referring initially to FIG. 1, a data parsing system 100 is illustrated in accordance with an aspect of the claimed subject matter. The data parsing system 100 provides a mechanism for parsing a data structure in accordance with a particular specification thereof. Parsing refers generally to querying, consuming or otherwise extracting data or information from an input. For example and not limitation, the data parsing system 100 can facilitate querying or retrieving data from a structured data source such as XML. The system 100 includes an interface component 110 and parse component 120.

The interface component 110 receives, retrieves or otherwise acquires or obtains code that describes data to be parsed. According to an aspect of this disclosure, the code can be specified in a declarative style or fashion. Declarative specification relates to generally declaring what needs to be done, rather than specifically outlining actual steps that need to be performed (e.g., imperative specification). By way of example, and not limitation, a declarative specification can correspond to a SQL (Structured Query Language) "select, from, where" query, FLWOR (For, Let, Where, Order Return) expression or the like. In one implementation, declarative code can be included as a language integrated query, wherein query operations, like SQL statements, are natively supported as first class citizens of a programming language.

The parse component 120 can receive or retrieve declarative code directly or indirectly from the interface component 110. Upon receipt or access, the parse component 120 can parse or process an identified data structure 130 in accordance with the declarative code and optionally return a result dependent upon an operation. In one instance, the declarative code can correspond to a query that returns a subset of data from the data structure 130, which can include, without limitation, XML (eXtensible Markup Language), objects (e.g., scripting language objects in JSON—JavaScript™ Object Notation), directories, comma separated files (CVS), database tables, data streams, music and video.

Moreover, parse component 120 can process data efficiently without requiring an entire data structure to be materialized in memory. In many cases, data structures are very large collections of data. As a result, loading the entire structure to memory prior to performing any operations thereon may be impossible and/or unaffordable. Furthermore, even when a structure is smaller, materialization of the whole structure may be inefficient in terms of processing and/or resource allocation. The parse component 120 addresses these concerns by utilizing data streaming alone or in conjunction with selective and/or transient materialization. Data can be processed serially or iteratively one element at a time where possible. In this manner, a memory footprint is limited substantially to the size of each element or a small group of elements. Memory space can also be reused or made available for recapture (e.g., garbage collection) after each element is processed. Additionally or alternatively, portions of a data structure can be materialized to memory, for example, where an operation or group of operations is unable to be effectuated in a single pass or serial manner.

It is to be appreciated that the system 100 can be implemented in many different manners. In one instance, system 100 and/or components thereof can be implemented as an application programming interface (API). For example, functionality provided by the parse component 120 and/or interface component 110 can be embodied as external program method calls (e.g., "stream( )," "materialize( )" . . . ). Alternatively, the functionality can be incorporated within a program language (e.g., XPath, XQuery . . . ), among other things, to facilitate efficient code generation and/or query execution, for instance.

For purposes of clarity and understanding, consider a problem of consuming or parsing huge amounts of XML. For the sake of a concrete example, consider the following book list:

```
<books>
    <book publisher="IDG books" on-loan="Sanjay">
        <title>XML Bible</title>
        <author>Elliotte Rusty Harold</author>
    </book>
    <book publisher="Addison-Wesley">
        <title>The Mythical Man Month</title>
        <author>Frederick Brooks</author>
    </book>
    <book publisher="WROX">
        <title>Professional XSLT 2nd Edition</title>
        <author>Michael Kay</author>
    </book>
    <book publisher="Prentice Hall" on-loan="Sander">
        <title>Definitive XML Schema</title>
        <author>Priscilla Walmsley</author>
    </book>
    <book publisher="APress">
        <title>A Programmer's Introduction to C#</title>
        <author>Eric Gunnerson</author>
    </book>
    ...
</books>
```

Suppose one desires to count all books whose title contains "XML." The following XPath query counts those books: "/books/book[contains(title, 'XML')]." The same task can be supported with an API that supports XML queries. The following sample code uses the language-integrated query (LINQ) to XML API, which provides API members that are similar to the XPath query axes. The book catalog is first loaded to memory and then a query performed to count the relevant books as follows:

```
var books = XElement.Load("Books.xml");
var count =
    (from b in books.Elements("book")
    let title = (string)b.Element("title")
    where title.IndexOf("XML") != -1
    select title
    ).Count( );
Console.WriteLine(count);
```

One problem with conventional query-enabled XML APIs as well as language implementations (e.g., XPath, XQuery, XSLT . . . ) is that they assume an in-memory representation for XML trees. However, as previously mentioned, an in-memory representation may not be possible and/or affordable. Accordingly, more efficient query semantics (or parsing approach) is needed such that serialized input is processed (say parsed) more directly and smaller portions are materialized in memory transiently.

In principle, low-level parsing APIs can be employed to process XML without loading it into memory. However, these low-level APIs require special programming skills and are cumbersome as well as error-prone. More specifically, use of such technology requires developers write specialized and complicated code to keep track of what they have seen before against that for which they are looking, essentially managing state. This becomes increasingly difficult as a function of data size, so much so that it is essentially impossible to do complicated things because the complexity quickly overwhelms a developer.

The data parsing system 100 provides a solution to identified issues with conventional technology. In particular, declarative style code can be employed utilizing functional programming-like idioms such as SQL (Structured Language Query)/LINQ (Language Integrated Query)/FLWOR (For, Let, Where, Order Return)-like queries over serialized and/or selectively materialized data. As a result, queries can be both efficiently written and executed.

In the example, an XML data source can be open for parsing, rather than loading the entire content. In this case, the code segment "var books=XElement.Load("Books.xml");" can be replaced with "var books=XElement.Open("Books.xml");" or the like. The original, in-memory query provided above can be preserved, as is, —if a suitable semantics is assumed of API members. Essentially, the query should be executed as a single sequential pass over the input. The query in question is indeed simple enough to lend itself to such an execution. As a result, the declarative style of an API for in-memory XML queries is preserved where the input is not to be loaded into memory but instead serialized.

The above example pertains to a simple data structure and query conducive to a full streaming implementation. It is to be appreciated that a number of more complicated scenarios can be addressed with differing mechanisms can be to preserve both code and execution efficiency. In effect, an optimal point can be located in a spectrum from fully serialized to fully materialized as a function of declarative code and/or a data structure. Similarly, degree of code declarativeness can also be impacted by the same or like factors.

Figure 2:
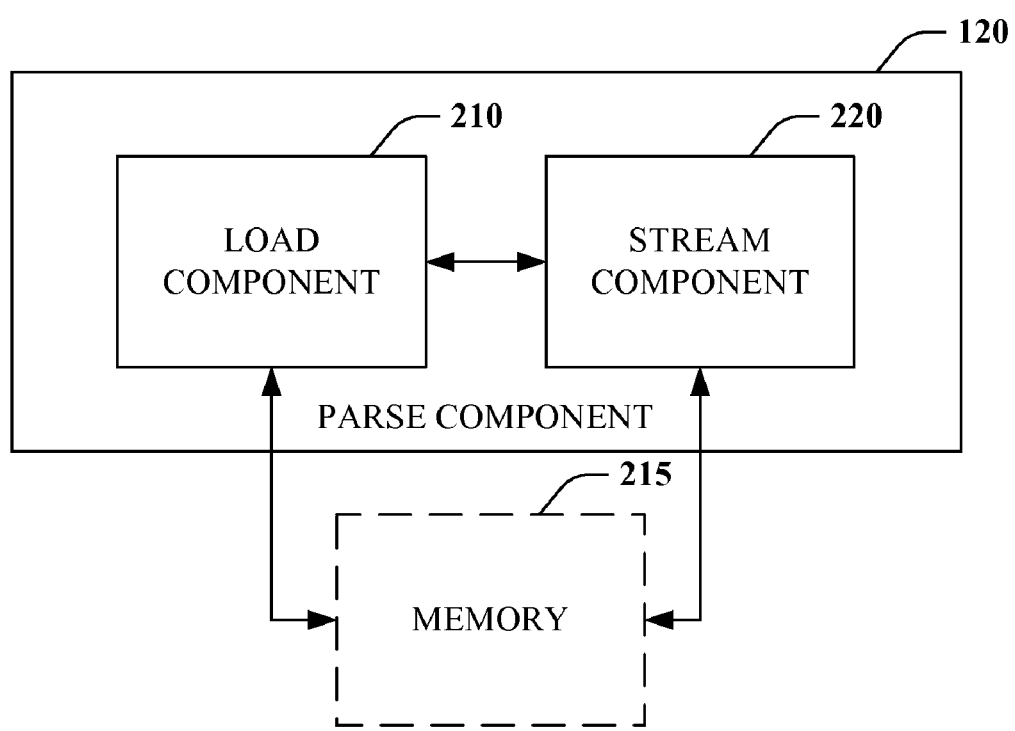
FIG. 2 is a block diagram of a representative parse component for evaluating data.

Turning to FIG. 2, a representative parsing component 120 is illustrated in accordance with an aspect of the claimed subject matter. As described with respect to system 100 of FIG. 1, the parsing component 120 can evaluate and/or extract data from a structure in a memory efficient fashion as a function of declarative-style code. In some instances, queries or like code can be nested or chained. Nested queries are those queries that include at least one other query or sub-query embedded within them. These queries are more complicated than un-nested queries and do not lend themselves to straightforward serial processing. In fact, nested queries by definition query into a data structure multiple times. This is works fine when a structure is fully materialized in memory. However, it is problematic where single-pass, serial or streaming semantics are to be employed. To resolve this issue, the parse component 120 includes a load component 210 and a stream component 220.

The load component 120 provides a mechanism for shallow loading of data in memory 215 (e.g., cache, RAM, volatile storage . . . ). In accordance with an aspect of the claimed subject matter, portions of code can be explicitly or implicitly designated for streaming at each level of a structure or iteration. This designated code is also referred to as a payload. Information not identified as a payload can be referred to as a preamble. All or part of a preamble can be materialized to support serialization of a payload. Load component 120 can open a file and perform shallow loading of memory with such information.

The stream component 220 evaluates designated data serially. Elements are retrieved iteratively and materialized to memory 215. Once the element is evaluated from memory, it can be replaced with subsequent element or alternatively made available for recapture by a garbage collector, for example. It should be appreciated that the stream component 220 can also utilize other information loaded to memory 215 by the load component 210. Further yet, the stream component 220 can also employ the load component 210 to perform shallow loading of data to facilitate nested evaluation.

Figure 3:
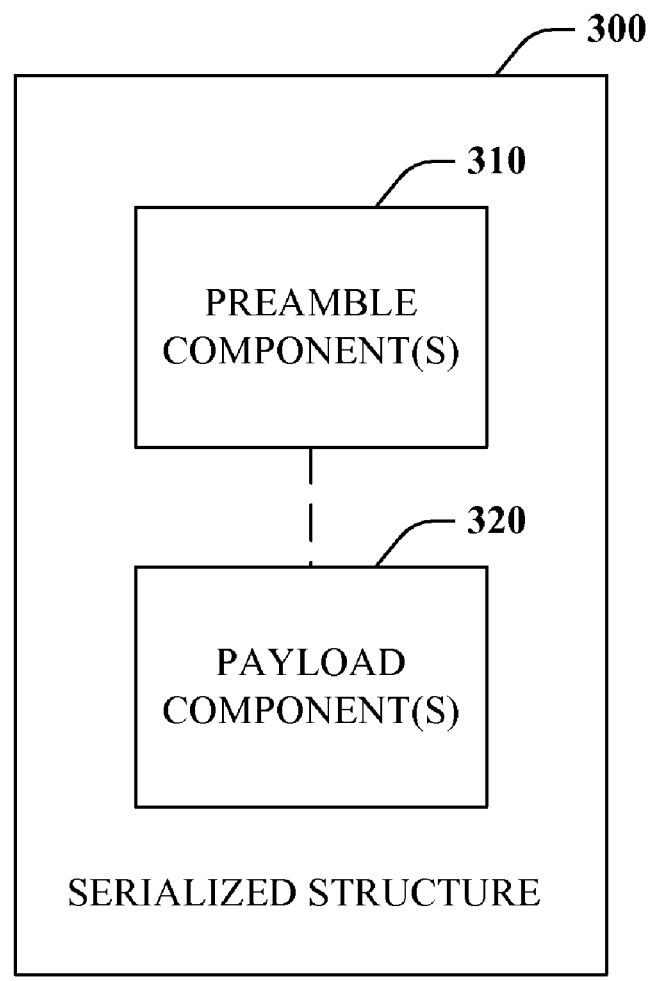
FIG. 3 is a block diagram of a representative serialized data structure produced by a parse component.

The parse component 120 can generate a serialized structure 300 in memory 215 as depicted in FIG. 3. The serialized structure 300 can include a plurality of preamble components 310 and payload components 320. The preamble components 310 can include materialized data prior to a designated payload. This data can be completely materialized and parented such that elements thereof can be queried in a normal unrestricted manner. In other words, it is not restricted to iterate-once or serial interaction. The payload components 320 can include a pointer or other identifier into a data structure to facilitate serialization or iteration across a portion of data such as a sub-tree. Amongst other reasons, the serialized structure 300 is beneficial in that it occupies a relatively small amount of memory space as compared to complete structure materialization.

The load component 210 and stream component 220 effectively allow streaming or sliding over an input. During this process, some data such as that corresponding to preamble information can be loaded to memory. Other data can be iteratively processed. Further yet, the iterative processing of data can utilize preamble information loaded in memory, among other things to aid data evaluation. Accordingly, parse component 120 is not limited to extremely rigid data. It can easily handle variations in structure such as where there is preamble information before elements of interest.

A concrete example is now provided to clarify aspects not to limit the claimed subject matter thereto. Consider the following XML tree for a product catalog (e.g., a wine catalog), whose products are further grouped in categories.

```
<catalog>
    <header>Ralf's opinionated wine catalog</header>
    <category>
        <id>extra-super</id>
        <header>1st level favorites</header>
        <doc>Please, bring those!</doc>
        <product id="1" country="France">
            Bordeaux, Château Mouton-Rothschild
        </product>
        <product id="2" country="France">
            Bordeaux, Château Brane-Cantenac
        </product>
        <product id="3" country="Portugal">
            Vinho Verde, Aliança
        </product>
    </category>
    <category>
        <id>still-super</id>
        <header>2nd level favorites</header>
        <doc>Please, bring those, too!</doc>
        <product id="4" country="France">
            Bordeaux, Château Pouget
        </product>
        <product id="5" country="Italy">
            Pinot Grigio, Ecco Domani
        </product>
    </category>
</catalog>
```

Suppose one desires to print all names of products that are in a category labeled "extra-super." In this case, one could iterate over all categories, select the one with the appropriate label and then iterate over all the products in that category. With an in-memory API, this query can be specified as follows:

```
// Load XML data source into memory
var wines = XElement.Load("Wines.xml");
// A query that iterates
var products =
    from category in wines.Elements("category")
        where (string)category.Element("id") == "extra-super"
            from product in category.Elements("product")
                select product.Value;
// Print the result of the lazy query
foreach (var p in products)
    Console.WriteLine(p);
```

The trouble with this query is that there are no reasonable parsing semantics for executing the query in a single-pass manner. The crux of the problem is that iteration is expressed over products of a "category" element while the "id" element of a category needs to be looked up. In general, the same element should not be queried twice under a single-pass parsing semantics. In addition, one should not assume that both queries can be performed in a single pass (in a sort of interleaved fashion), although this may be possible, because of order constraints on the results of the two queries. In the example, the "id" element should be inspected first and then "product" elements filtered based thereon. The original query does not promise this particular order among "id" and "product" elements.

This problem can be solved by requiring a programmer to list up-front element labels for iteration at each level of the tree, when the XML data source is set up. Alternatively, these labels may be able to be omitted where they can be inferred or otherwise determined automatically. The identified elements are also called the payload of parsing (say streaming) (or simply payload), whereas all elements before such payload elements compromise what is referred to as the preamble. In the example, categories and products amount to the payload at the two levels under the rooting catalog element, wherein the "id" element appears in the preamble of the "category" elements (e.g., before the payload of the "category" elements, which are the "product" elements).

The capability of nested iteration can be added to an existing in-memory API as follows. Instead of a complete Load(. . . ), a LoadStream(. . . ) operation can be utilized, which sets up the element labels for the payload:

```
// Open XML data source and perform shallow load
var wines = XElement.LoadStream(
    "Wines.xml",            // The XML data source
    "catalog",              // The rooting element label
    "category", "product"   // Element labels for payload
);
```

This operation returns a shallow element for the catalog—not containing any of the payload elements to be streamed over. If one were to inspect the "wines" variable at this time, the follow content would be revealed:

```
<catalog>
    <header>Ralf's opinionated wine catalog</header>
</catalog>
```

Therefore, there are no "category" elements because payload elements are not parented; neither are they loaded automatically. There is a "header" element though because it is found in the preamble of the "catalog" element before parsing hits the first "category" element (or the end of the "catalog" element).

In general, preamble elements are materialized and parented. Hence, preamble elements can be queried in a conventional manner. The payload is accessed by a designated Stream( ) method (a new axis so to say) which parses the payload in its serialized form. Clearly, one can iterate over the payload only once.

The earlier in-memory query for printing selected product names evolves as follows: queries for the payload (based on the Elements axis) are basically replaced by a new Stream axis and the query regarding the preamble remains unchanged as shown below:

```
// A query that uses the new Stream axis
var products =
    from category in wines.Stream( )    // Elements("category")
        where (string)category.Element("id") == "extra-super"
            from product in category.Stream( )  // Elements("product")
                select product.Value;
```

Printing the result of the query commences as before:

```
foreach (var p in products)
    Console.WriteLine(p);
```

Now consider execution and memory state of the above code. First, the "wines.xml" file can be opened and some verification performed to unsure a valid starting state. The catalog element is then shallow loaded until it hits the first category element, because that is a designated element over which iteration is to occur. At this point the memory state resembles:

```
<catalog>
    <header>Ralf's opinionated wine catalog</header>
</catalog>
```

Basically, the file is opened and nested iteration is initialized to start before the first element of the outer most iterator label which is "category."

The remainder of execution is driven by the query. The first line says iterate over the stream of "category" elements in the "wine" catalog. Elements returned by this streaming are again trees that subject to a new level of distinction between materialized preamble and iterate-once payload. In this case, the payload is the nested product element. Accordingly, shallow loading can be performed loading preamble information up until the "product" element. The resulting memory state resembles:

```
<catalog>
    <header>Ralf's opinionated wine catalog</header>
    <category>
        <id>extra-super</id>
        <header>1st level favorites</header>
        <doc>Please, bring those!</doc>
    </category>
    <category>
        <id>still-super</id>
```

```
        <header>2nd level favorites</header>
        <doc>Please, bring those, too!</doc>
    </category>
</catalog>
```

Next or concurrently, the data can be filtered by the "where" clause to identify only categories of including the id "extra-super." As a result, categories that are not labled "extra-super" can be thrown away or alternatively information pertaining thereto never materailized. The resulting memory state resembles:

```
<catalog>
    <header>Ralf's opinionated wine catalog</header>
    <category>
        <id>extra-super</id>
        <header>1st level favorites</header>
        <doc>Please, bring those!</doc>
    </category>
</catalog>
```

Finally, products for this single category can be iterated over and printed to a screen. The result identifies three wines "Bordeaux, Château Mouton-Rothschild," "Bordeaux, Château Brane-Cantenac" and "Vinho Verde, Alianca." Since there is no preamble information for products, they can simply be materialized, evaluated, and thrown away one by one. Accordingly, "product" element need only be transiently resident such that only one element is in memory at a time. For the first element the memory state can resemble:

```
<catalog>
    <header>Ralf's opinionated wine catalog</header>
    <category>
        <id>extra-super</id>
        <header>1st level favorites</header>
        <doc>Please, bring those!</doc>
        <product id="1" country="France">
            Bordeaux, Château Mouton-Rothschild
        </product>
        </product>
    </category>
</catalog>
```

As can be observed, streaming processing of nested queries results in substantially less memory utilization than full materialization. Although a rudimentary statistic, the above example results in a total of approximately twelve lines of code materialized compared to twenty-eight for complete structure materialization. Furthermore, memory state fluxates such that the average amount of code is even less. This translates to enormous memory savings for much larger structures.

To summarize, XML trees are loaded into the memory in a shallow fashion such that loading stops at the previously identified payload of the XML input. While the preamble of the payload can be queried in the normal manner, the payload is queried at most once by a special streaming member. The reliable distinction between preamble and payload rests on up-front identification of labels for payload elements through all levels of nesting. Each element returned by the streaming member is again a shallow XML tree that is subjected to a new level of distinction between materialized preamble and iterate-once payload. These shallow elements are never parented and hence can be easily recovered by garbage collection.

The previously described exemplary idiom may be limited in some ways. For instance, the descendant axis and the provision of functional updates would require non-trivial elaborations of the idiom. Additionally, diverse use of the original XML-tree type for preamble elements and non-parented payload elements may count as pragmatic.

A more general and principled approach is to designate a new object type to serialize a data structure, for example "XElementReader" to serialized XML trees. An instance of the object can denote a pointer to a serialized structure. Object methods and/or functions can be similar to that of an in-memory object except that a method can exist for opening streaming data rather than loading data into memory. Similarly, rather than returning materialized sub-trees, pointers to serialized trees can be returned. In this manner, very similar programming models can exist for both in-memory and streaming semantics, if there are two implementations. One that works in memory and the other that reads over serialized structures.

In terms of XML and the previous example, an XElementReader instance can denote a pointer to a serialized tree:

Just as the initial in-memory tree (e.g., XElement instance) for an in-memory query may be constructed by the static method "XElement.Load," the initial pointer to a serialized tree (e.g., XElementReader instance) for a streaming query may be constructed by a static method "XElementReader.Open."

Just like downward queries on an XElement instance return sub-trees (e.g., lists of XElement instances), downward queries on an XElementReader instance return new pointers to serialized sub-trees. Each query corresponds to progress in a single pass over a serialized XML tree.

In sum, parsing semantics opens a data source, and query execution seeks into the serialized structure driven by a downward query. Many of these axes can be executed under a parsing semantics. Essentially, all axes for downward queries are conveniently enabled for the parsing semantics, while some additional forward queries could also be enabled. However, the parsing semantics can be limited such that at most one query can be applied to each given node. This restriction is implied by the single-pass sequential nature of parsing semantics. The following is a table of typical XML queries and comments on serial parsing semantics:

TABLE A

| Query form (axis) | Parsing semantics |
|---|---|
| Element label | Store label when pointer is positioned |
| Attributes (all or by name) | Store attributes when pointer is positioned |
| Children (all or by name) | Seek to serialized sub-trees of current tree |
| Simple-typed content access | Read content of current tree |
| Descendants (all or by name) | Semantics questionable |
| Top-most descendants by name | Seek to serialized descendants of current tree |
| Parent | No declarative semantics |
| Ancestors | No declarative semantics |
| Preceding siblings | Violation of one-pass sequential model |
| Following sibling | Possible |
| Preceding nodes in document order | Violation of one-pass sequential model |
| Following nodes in document order | Possible |

Figure 4:
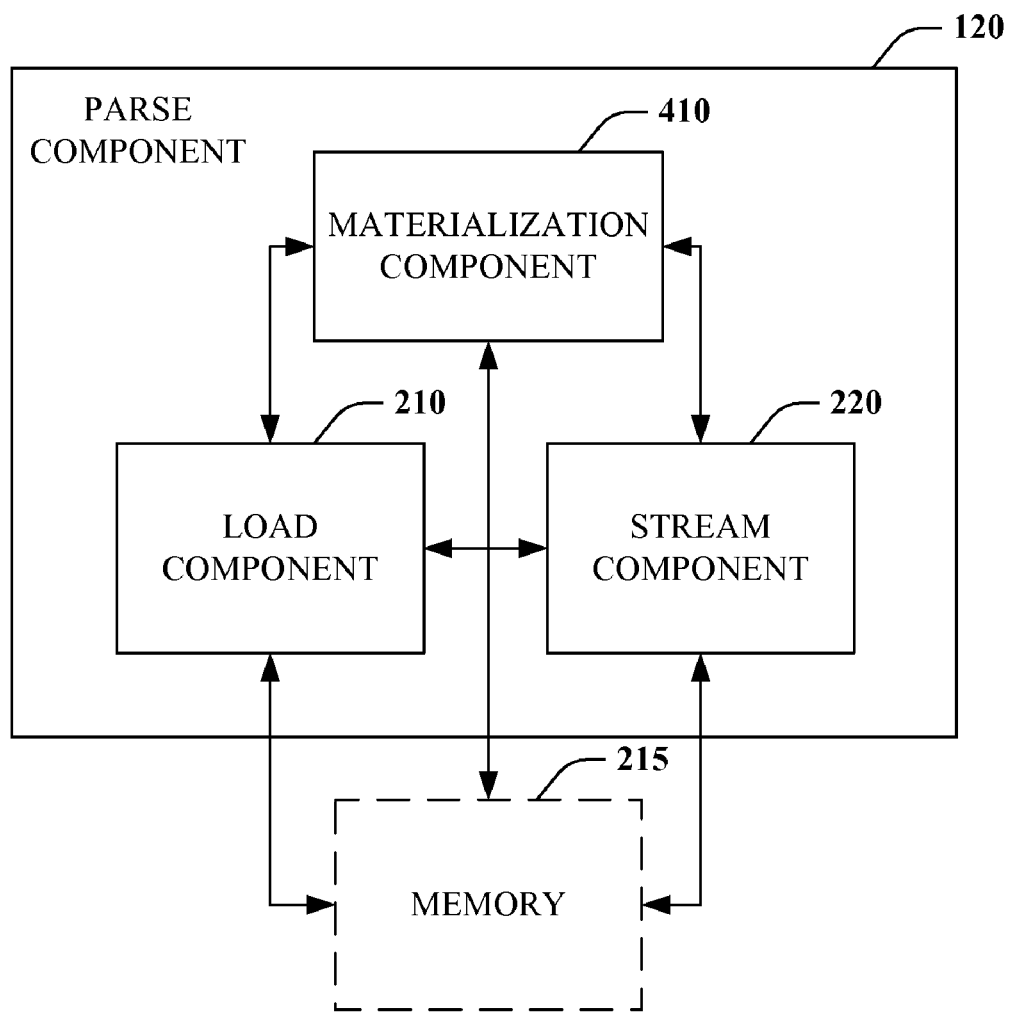
FIG. 4 is a block diagram of a representative parse component for evaluating portions of materialized data.

Referring to FIG. 4, another representative data parse component 120 is illustrated in accordance with an aspect of the claimed subject matter. Similar to FIG. 2, the parse component 120 include the load component 210 and stream component 220, as previously described. In brief, the load component 210 provides a mechanism for shallow loading portions of a data structure in memory 215 and stream component 220 streams through data iteratively interacting with the load component 210 and memory 215 where necessary. In essence, the components 210 and 220 facilitate serial processing of a data structure including nested iteration.

However, in some instance, serial or iterate-once processing may not be desirable or even possible. Accordingly, the parse component 120 can include a native, or interact with a foreign, materialization component 410. The materialization component 410 is a mechanism for materializing portions of a data structure to memory 215 (e.g., implicitly or explicitly) to facilitate evaluation. In one instance, the materialization component 410 can be utilized as an escape from serial processing to richer in-memory processing. However, materialized portions need not be parented with other portions of structures thereby making them available for garbage collection after use. Further yet, it should also be appreciated that materialization component 410 can be employed to add in-memory processing such that a portions of a structure are evaluated in-memory and others serially.

To aid understanding, consider the problem of listing all books on loan from an XML document of a large number of books. The following is a reference solution utilizing an in-memory language integrated query.

```
var books = XElement.Load("Books.xml");
var loans =
    from b in books.Elements("book")
    where b.Attribute("on-loan") != null
    select b;
foreach (var l in loans)
    Console.WriteLine(
        "borrower:" + (string)l.Attribute("on-loan") + "; " +
        "title:" + (string)l.Element("title") + "; " +
        "author:" + (string)l.Element("author"));
```

For each given book on loan, its title, author and borrower are determined. If this query is desired to be executed with serial parsing semantics, there is a problem, because these multiple queries on a book cannot be performed in such a fashion. Materialization (e.g., implicit or explicit) comes to rescue. That is, the query can begin with the parsing semantics, but escape to the richer in-memory semantics by materialization—once books of interest have been identified. The in-memory semantics enables execution of multiple queries on each given book.

The sample code evolves as follows (note the use of the new object type "XElementReader" previously described):

```
var books = XElementReader.Open("Books.xml");
var loans =
    from b in books.Elements("book")
    where b.Attribute("on-loan") != null
    select b.Materialize( );
foreach (var l in loans)
    Console.WriteLine(
        "borrower:" + (string)l.Attribute("on-loan") + "; " +
        "title:" + (string)l.Element("title") + "; " +
        "author:" + (string)l.Element("author"));
```

That is, each book in the query result is materialized and hence the final loop observes normal, in-memory XML trees as opposed to pointers to sequentially processed, serialized XML trees. The materialized trees are not parented in any way. Hence, each single tree becomes available to garbage collection once the for-loop completes the body for the given book.

The materialization component 410 can also be utilized to facilitate specification of order constraints, which normally are not done in in-memory cases. More specifically, the materialization component 410 can interact with the load component 210, memory 215 and/or stream component 220 to materialize a portion of data up until a certain designated point (e.g., MaterializeUntil(x)). Further yet, a serialized structure can be constructed including a preamble and payload as previously described with respect to nested iteration.

The query axes as discussed so far, for "XElementReader" for example, cover chaining but branching is not valid. For instance, the following code pattern is invalid; an attempt is made to "dot" twice into the same "XElementReader" instance "xre:"

```
Console.WriteLine(xre.Element("foo") != null);
foreach (var x in xre.Elements("bar"))
    Console.WriteLine((string)x.Attribute("id"));
```

If no assumptions can be made about the order of "foo"s and "bar"s, then there is fundamentally no way to perform these queries in a single pass with only bounded cache. A programmer should explicitly restrict the query to the case that a relevant "foo" (if, any) must appear before the first "bar."

The distinction between preamble and payload that was already made for nested iteration can be re-enabled here. To this end, an original axis, "MaterializeUntil," for ordered, branching queries with parsing semantics is added. Here is the necessary revision of the branching query:

```
var branch = xre.MaterializeUntil("bar");
Console.WriteLine(branch.Element("foo") != null);
foreach (var x in branch.Stream("bar"))
    Console.WriteLine((string)x.Attribute("id"));
```

This pattern is read as follows: materialize "xre" until before the first "bar" (if, any); the result, "branch," provides access to the materialized preamble and to the payload. The insight regarding this form of branching queries is that for every "XElementReader" instance "xre" and every label "n," the following two queries are equivalent:

xre.Elements(n)=xre.MaterializeUntil(n).Stream( )

The point is that the second form (e.g., for ordered, branching queries) additionally provides access to the preamble, that is, all the children that appear before the stream of elements labeled "n." By materializing the preamble, it can be queried multiple times and regardless of the progress with the stream. The specific idiom of nested iteration can now be fully subsumed by the additional query axis of the "XElementReader" type and an associated "MaterializeUntil" method. Hence, the sample that we used to for nested iteration can be reconstructed in this form as follows:

```
// Open XML data source
var wines = XElementReader.Open("Wines.xml");
// A query that iterates
var products =
    from category in wines.Elements("category")
    let branch = category.MaterializeUntil("product")
    where (string)branch.Element("id") == "extra-super"
    from product in branch.Stream( )
    select product.Value;
// Print the result of the lazy query
foreach (var p in products)
    Console.WriteLine(p);
```

It should be noted that this is a much more compositional version of the previously presented code. Further, it is to be appreciated that additional alterations are also possible to further increase code compositionality The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the parse component 120 can utilize such mechanisms to infer element labels for payloads and/or implicitly identify and initialize materialization of structure where need for code parsing that employs serial parsing semantics.

In view of the exemplary systems described supra, methodologies that may be implemented in accordance with the disclosed subject matter will be better appreciated with reference to the flow charts of FIGS. 5-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 5:
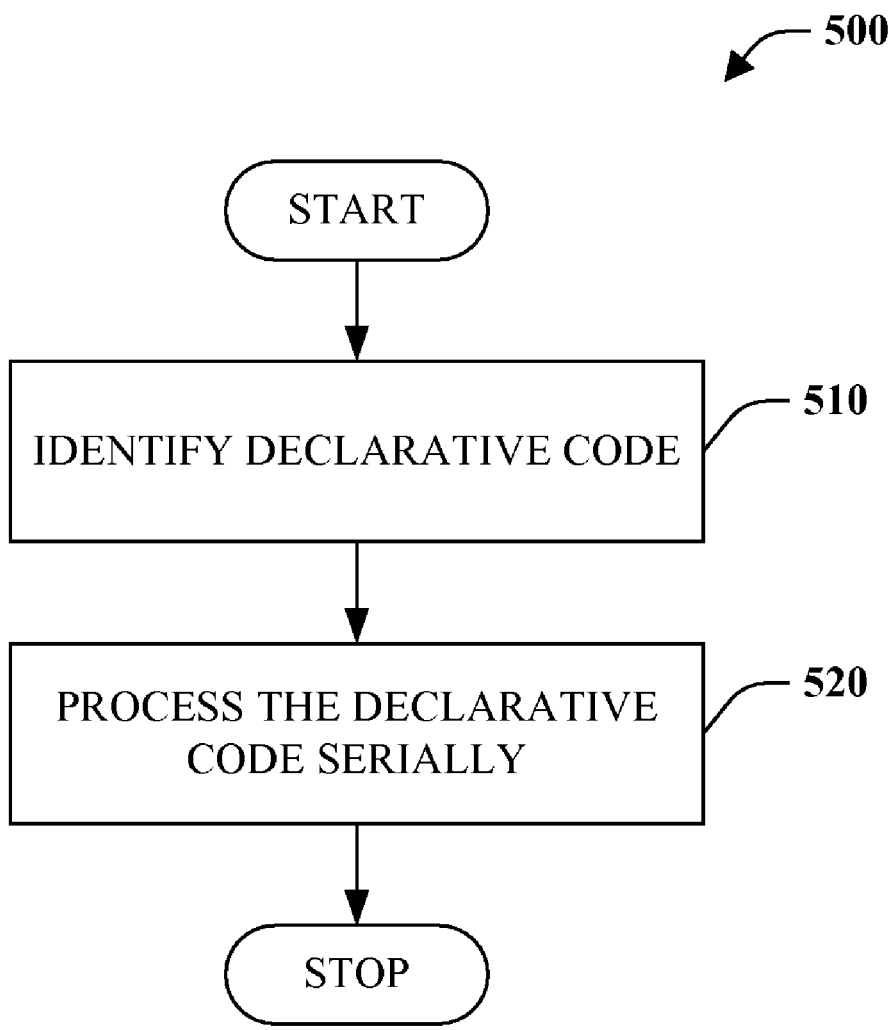
FIG. 5 is a flow chart diagram of a method of data parsing in accordance with an aspect of the claimed subject matter.

Referring to FIG. 5, a method of data parsing 500 is illustrated in accordance with an aspect of the claimed subject matter. At reference numeral 510, declarative code is identified for data parsing (e.g., querying, extracting, consuming, transforming . . . ). Declarative code identifies what action should be taken, rather than how an action is to be performed, which is characteristic of imperative code. Examples of declarative style code can be found in SQL, LINQ and FLWOR expressions. For instance, a data source can be identified and elements of the source selected as a function of a description of the data such as products sold in the United States. At numeral 520, the declarative code is processes serially over an input source. The input source can be opened and serial parsing semantics implemented to parse or process data elements one by one in a streaming fashion in accordance with the declarative code without first loading an entire relevant data source in memory. Accordingly, method 500 preserves overall convenience of writing declarative code while providing underlying semantics for memory efficient processing of data in a serial or iterative manner.

Figure 6:
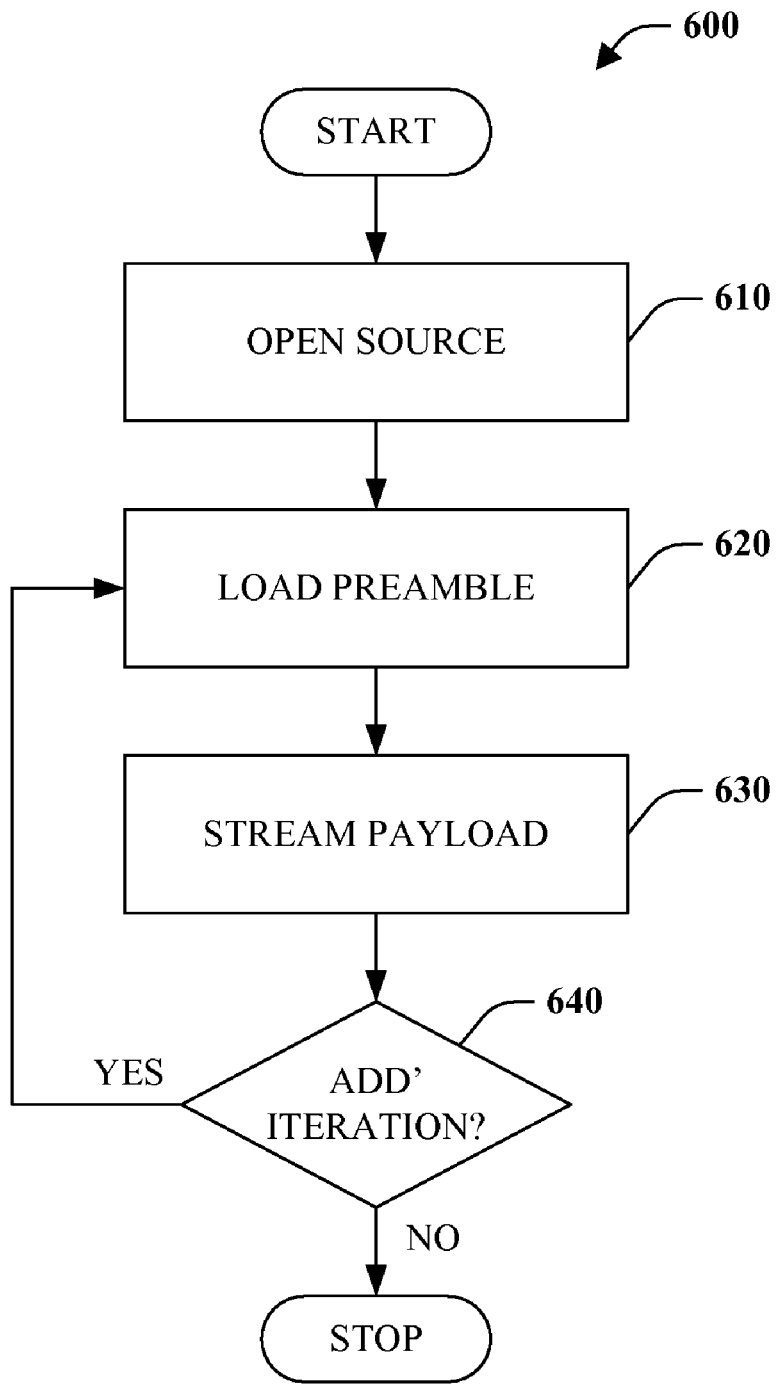
FIG. 6 is a flow chart diagram of a method of parsing data with nested code in accordance with an aspect of the claimed subject matter.

FIG. 6 depicts a method for data parsing utilizing nested code 600 in accordance with an aspect of the claimed subject matter. At reference 610, a source is open. For example, a structured data file or document can be opened. At numeral 620, a preamble, if one exists, is loaded to memory. The preamble is a set of data prior to a structure specified for iterative processing, also referred to as a payload. At reference numeral 630, the payload is stream or serially processed. In other words, a portion of data such as a sub-tree can be iteratively evaluated one element at a time. Each element can be materialized to memory, parsed/evaluated, and then the memory space reused for a subsequent element or made available for recapture. A determination is made at 640 as to whether there is an additional iteration or nested code. If yes, the method can continue at 610, where a preamble, if any, is loaded and the payload is stream processed utilizing serial parsing semantics. If no, the method can simply terminate.

Figure 7:
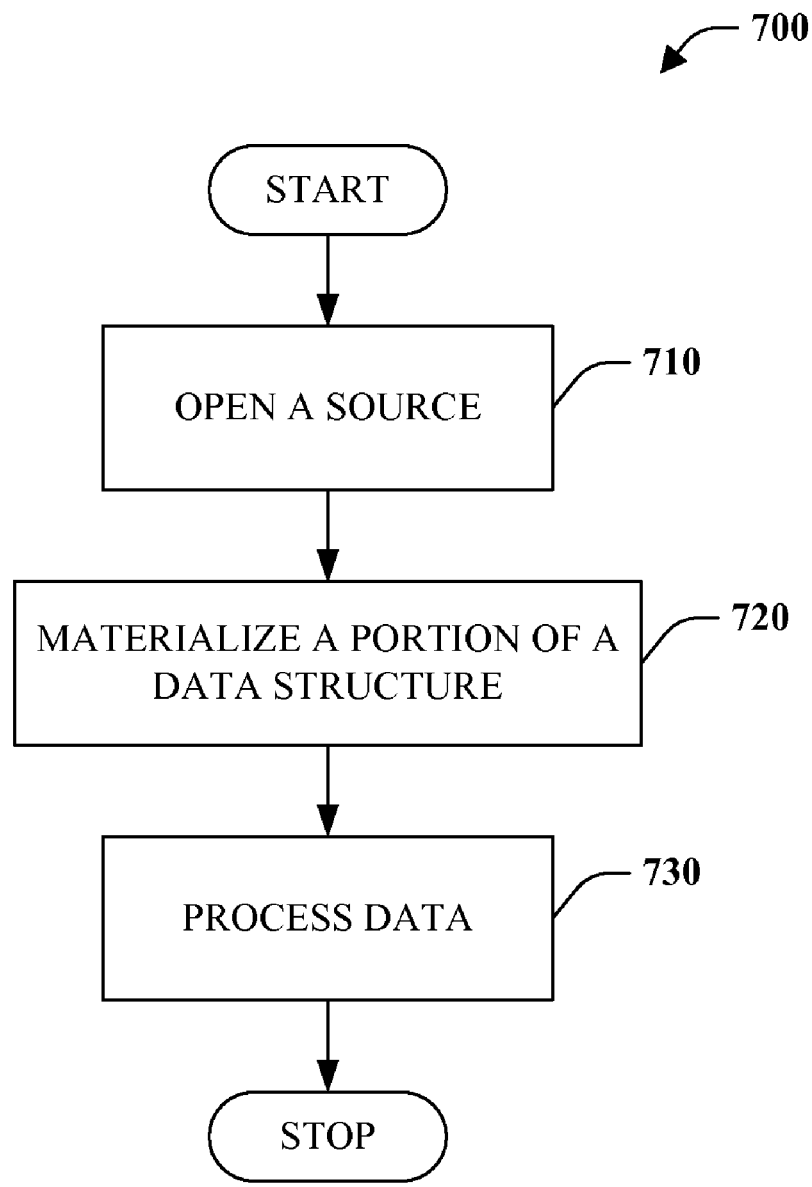
FIG. 7 is a flow chart diagram of a method of data parsing employing data segment materialization in accordance with an aspect of the claimed subject matter.

FIG. 7 a flow chart diagram is provided illustrating a method of data parsing 700 in accordance with an aspect of the claimed subject matter. At reference numeral 710, a data source is opened for parsing. At numeral 720, a select portion of a data structure is loaded to memory. For example, a sub-tree can be materialized in memory. Data can be processed or otherwise evaluated in memory at 730. In this instance, materialization can be employed to escape serial parsing semantics. For example, consider the following query for totaling salaries that designates materialization of a serialized tree at hand as an in-memory tree:

```
static double Total(XElementReader company)
{
    return
        (from s in company.Topmosts("salary")
        select (double) s.Materialize( )
        ).Sum( );
}
```

It should also be noted that semantics can be mixed such that a portion of data is evaluated serially while another portion is processed utilizing a materialized in-memory structure.

Figure 8:
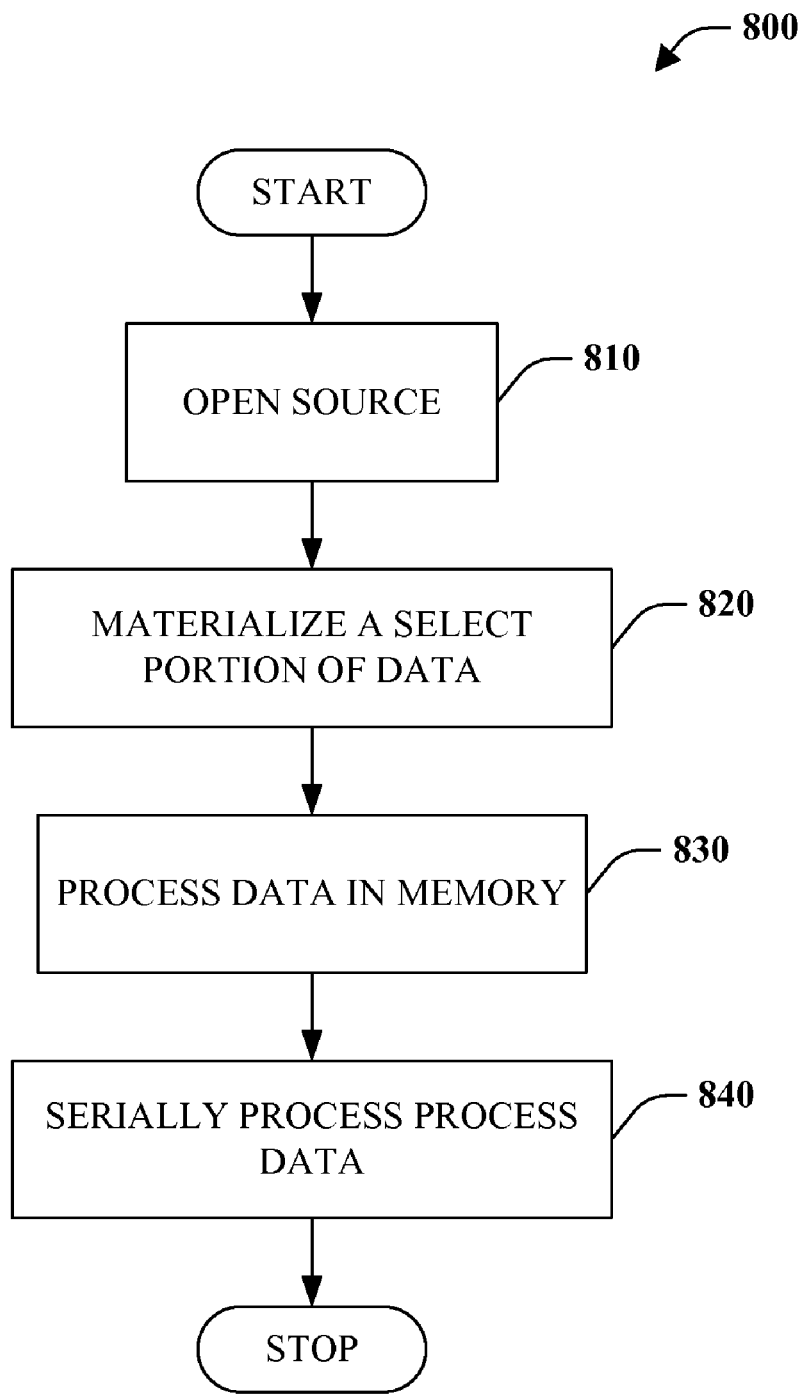
FIG. 8 is a flow chart diagram of a method of parsing branching queries in accordance with an aspect of the claimed subject matter.

Turning attention to FIG. 8, a method of parsing branching queries, aggregations and/or transformations 800 is illustrated in accordance with an aspect of the claimed subject matter. Branching queries can be defined as multiple queries departing from the same node of a tree or other structure. By way of example, if a data structure includes "element" nodes queries or other parsing semantics are to be performed with respect to two particular elements "foo" and "bar," a single pass problem can occur such that while looking for elements "foo," elements "bar" will be passed without identification. This problem can be solved by explicit ordering of queries and use of materialization.

At reference numeral 810, a source is open for serial parsing. A select portion of data can be materialized in memory at 820, for example of in accordance with a "MaterializeUntil" method. In one instance, a serialized structure can be creates as described with respect to nesting such that a preamble is materialized up to a pointer to a payload to be iteratively processed. At reference 830, a first branch query is processed utilizing the in-memory data structure. At numeral 840, a second branch query or the like can be serially evaluated. This scenario assumes that elements described by the first query appear in order before elements of the second query.

It is to be appreciated that the branch query method 800 incorporates aspects described regarding nested queries including utilizing a serialized structure including preambles and payloads. Moreover, it is to be noted that method 800 can applied to nested query processing.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
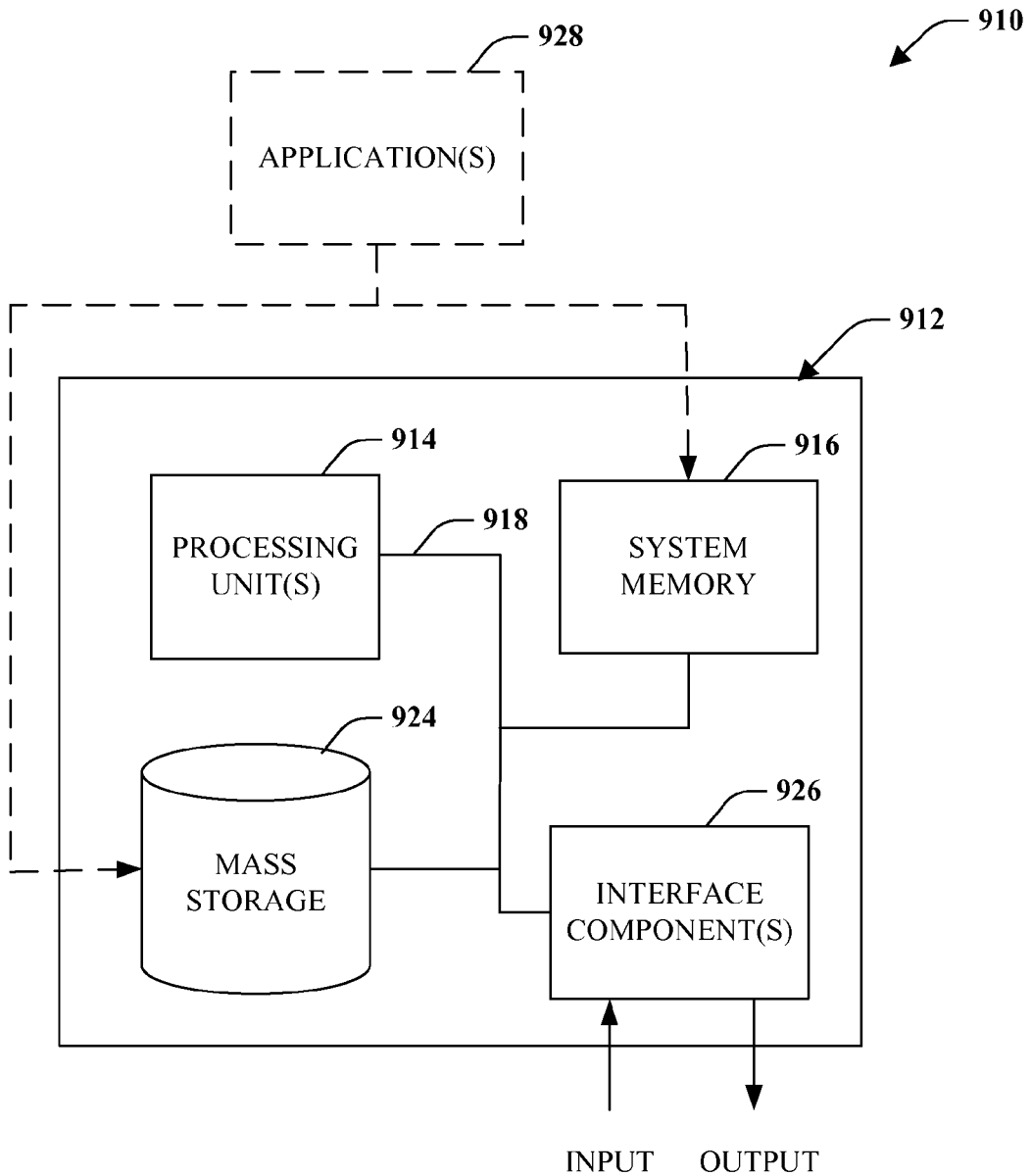
FIG. 9 is a schematic block diagram illustrating a suitable operating environment for aspects of the subject disclosure.
Figure 10:
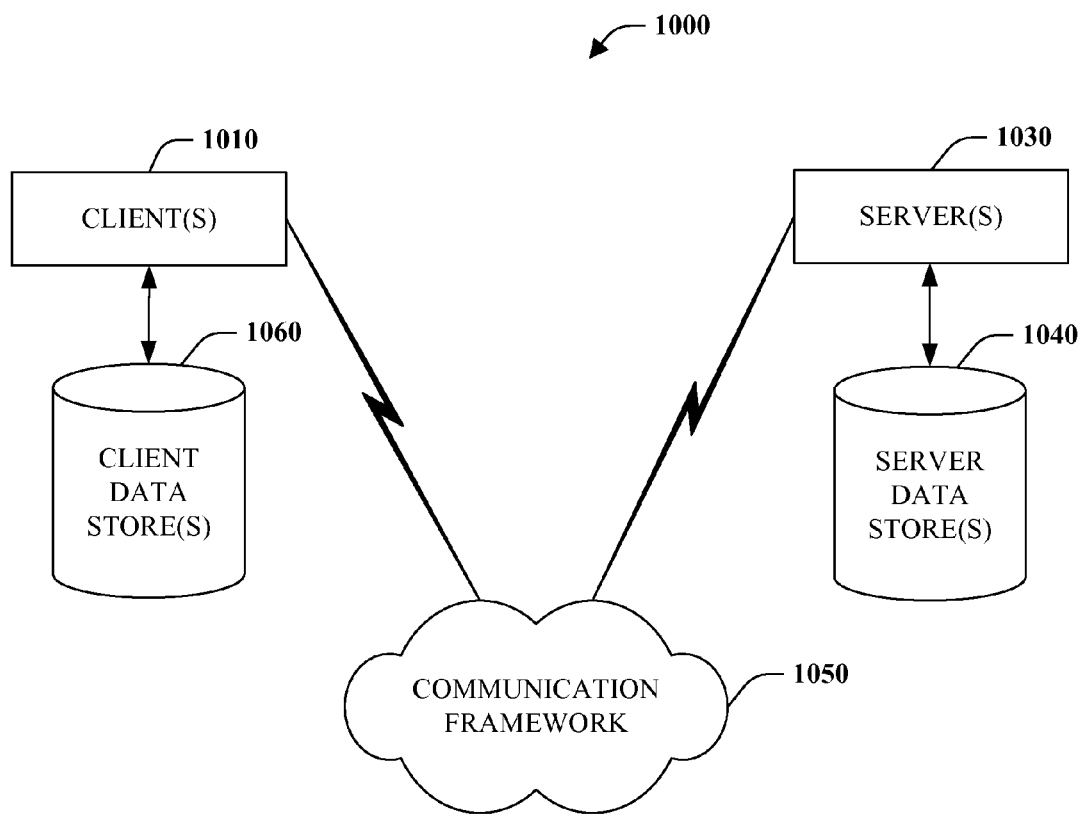
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 9, an exemplary environment 910 for implementing various aspects disclosed herein includes a computer 912 (e.g., desktop, laptop, server, hand held, programmable consumer or industrial electronics . . . ). The computer 912 includes a processing unit 914, a system memory 916 and a system bus 918. The system bus 918 couples system components including, but not limited to, the system memory 916 to the processing unit 914. The processing unit 914 can be any of various available microprocessors. It is to be appreciated that dual microprocessors, multi-core and other multiprocessor architectures can be employed as the processing unit 914.

The system memory 916 includes volatile and nonvolatile memory. The basic input/output system (BIOS), containing the basic routines to transfer information between elements within the computer 912, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 912 also includes removable/non-removable, volatile/non-volatile computer storage media. FIG. 9 illustrates, for example, mass storage 924. Mass storage 924 includes, but is not limited to, devices like a magnetic or optical disk drive, floppy disk drive, flash memory or memory stick. In addition, mass storage 924 can include storage media separately or in combination with other storage media.

FIG. 9 provides software application(s) 928 that act as an intermediary between users and/or other computers and the basic computer resources described in suitable operating environment 910. Such software application(s) 928 include one or both of system and application software. System software can include an operating system, which can be stored on mass storage 924, that acts to control and allocate resources of the computer system 912. Application software takes advantage of the management of resources by system software through program modules and data stored on either or both of system memory 916 and mass storage 924.

The computer 912 also includes one or more interface components 926 that are communicatively coupled to the bus 918 and facilitate interaction with the computer 912. By way of example, the interface component 926 can be a port (e.g., serial, parallel, PCMCIA, USB, FireWire™ port . . . ) or an interface card (e.g., sound, video, network . . . ) or the like. The interface component 926 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 912 to output device(s) via interface component 926. Output devices can include displays (e.g., CRT, LCD, plasma . . . ), speakers, printers and other computers, among other things.

FIG. 10 is a schematic block diagram of a sample-computing environment 1000 with which the subject innovation can interact. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing the aspects of the subject innovation, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030. For example, data housed in server store 1040 can be parsed on a client 1010 wherein the data is streamed from a server 1030 to a client 1010 over the communication framework 1050.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A data parsing system, comprising:
 a processor for processing the data parsing system;
 a system memory;
 an interface component to acquire at least a portion of declarative software code that identifies data in a single data structure, wherein the declarative code comprises software code that generally declares a desired outcome for the identified data without specifically outlining the steps to take to achieve the desired outcome for the identified data; and
 a parse component that facilitates production of identified data in accordance with the declarative code without loading the entire data structure in memory, wherein the parse component is configured to parse a selected portion of the data structure identified by the declarative software code, wherein the selected portion of the data structure is both selectively streamed to the parse component and, upon arriving as part of the stream, is selectively and transiently loaded into memory from the data structure as a whole, such that only a portion of the data structure is streamed and only a portion of the streamed data is loaded into memory, and wherein an optimal point is determined for how much of the data in the data structure is loaded into memory, based on both the specific declarative code used and the specific data structure used.

2. The system of claim 1, further comprising a load component that opens a data source and performs a shallow load of data in memory in accordance with one or more user specifications.

3. The system of claim 2, the load component loads data up to a specified location inside data to be streamed.

4. The system of claim 2, further comprising a stream component that serializes an identified segment of data in memory.

5. The system of claim 4, the stream component produces a shallow data structure including a materialized portion and a stream portion to enable iterative nested processing.

6. The system of claim 4, the stream component serializes data items to memory transiently.

7. The system of claim 2, further comprising a materialization component that materializes a nested sub-structure to enable multi-pass parsing over an in-memory structure.

8. The system of claim 2, further comprising a materialization component that materializes a designated portion of the structure to enable correct and efficient processing of branching queries.

9. The system of claim 1, the parse component employs a unique object type to serialize a data structure.

10. The system of claim 1, the declarative code is a program language integrated query.

11. The system of claim 1, at least one of the components forms part of an application programming interface or program language implementation.

12. At a computer system comprising a processor, a computer-implemented method of data processing, comprising:
 receiving a declarative style nested statement specifying a query, transformation or aggregation over a single data structure, wherein the declarative style comprises software code that generally declares a desired outcome for the identified data without specifically outlining the steps to take to achieve the desired outcome for the identified data; and
 using the processor, processing the statement to provide a result without loading the entire data structure in memory, wherein the processing comprises parsing a selected portion of the data structure identified by the declarative software code, wherein the selected portion of the data structure is both selectively streamed to the parse component and, upon arriving as part of the stream, is selectively and transiently loaded into memory from the data structure as a whole, such that only a portion of the data structure is streamed and only a portion of the streamed data is loaded into memory, and wherein an optimal point is determined for how much of the data in the data structure is loaded into memory, based on both the specific declarative code used and the specific data structure used.

13. The method of claim 12, further comprising receiving a list of positions in the data structure for iteration at each nesting level.

14. The method of claim 13, further comprising opening a data source and loading a first segment of data in memory up to a first position.

15. The method of claim 14, further comprising iterating over the first segment of data and materializing a second segment of data to memory up to a second position.

16. The method of claim 15, further comprising iterating over the second segment.

17. The method of claim 16, further comprising materializing second segment data items in memory transiently.

18. A computer readable storage medium having stored thereon a computer program which, when executed by a processor, performs the following:

identifies data within a single data structure using declarative code, wherein the declarative style code comprises software code that generally declares a desired outcome for the identified data without specifically outlining the steps to take to achieve the desired outcome for the identified data; and identifies portions of the structure for stream processing at one or more levels of nesting using data item identifiers, wherein the processing comprises parsing a selected portion of the data structure identified by the declarative software code, wherein the selected portion of the data structure is both selectively streamed to the parse component and, upon arriving as part of the stream, is selectively and transiently loaded into memory from the data structure as a whole, such that only a portion of the data structure is streamed and only a portion of the streamed data is loaded into memory, and wherein an optimal point is determined for how much of the data in the data structure is loaded into memory, based on the specific declarative code used, the specific data structure used.

19. The computer readable medium of claim 18, the declarative style code is a language integrated query.

20. The computer readable medium of claim 19, the data structure is one of an XML structure, an object, a directory, a comma separated file, a database table and a data stream.

* * * * *